United States Patent
Schuster

[11] Patent Number: 6,089,628
[45] Date of Patent: Jul. 18, 2000

[54] STIFFENER ASSEMBLY FOR BUMPER SYSTEM OF MOTOR VEHICLES

[75] Inventor: Peter John Schuster, Dearborn, Mich.

[73] Assignee: Ford Global Technologies, Inc., Dearborn, Mich.

[21] Appl. No.: 09/145,769

[22] Filed: Sep. 2, 1998

[51] Int. Cl.[7] ................................................. B60R 19/38
[52] U.S. Cl. ............................ 293/118; 293/15; 293/120
[58] Field of Search ................................... 293/118, 120, 293/142–145, 15, 34, 38–39

[56] References Cited

U.S. PATENT DOCUMENTS

| | | | |
|---|---|---|---|
| 3,003,568 | 10/1961 | Merritt et al. | 172/7 |
| 3,005,657 | 10/1961 | Walker | 293/118 |
| 3,051,041 | 8/1962 | Lehmann et al. | 88/24 |
| 3,784,244 | 1/1974 | Emi | 293/120 |
| 3,847,427 | 11/1974 | Eshelman | 293/118 |
| 3,913,963 | 10/1975 | Persicke | 293/118 |
| 3,992,047 | 11/1976 | Barényi et al. | |
| 4,015,870 | 4/1977 | Stcherbatcheff et al. | 293/32 |
| 4,076,295 | 2/1978 | Gutman | 203/71 R |
| 4,093,290 | 6/1978 | Pearson | 293/15 |
| 4,131,308 | 12/1978 | Holka et al. | 296/1 S |
| 4,206,022 | 6/1980 | Gunjima et al. | 204/98 |
| 4,514,002 | 4/1985 | McIntosh | 293/118 |
| 4,582,351 | 4/1986 | Edwards | 293/118 |
| 4,641,871 | 2/1987 | Vaughn | 293/118 |
| 4,659,130 | 4/1987 | Dimora et al. | 293/118 |
| 4,770,420 | 9/1988 | Gottwald et al. | 293/118 |
| 4,778,212 | 10/1988 | Tomforde | |
| 4,991,890 | 2/1991 | Paulson | 293/118 |
| 5,460,421 | 10/1995 | Culbertson | |
| 5,518,283 | 5/1996 | Egelske | 293/118 |
| 5,520,428 | 5/1996 | Bell | 293/118 |
| 5,620,219 | 4/1997 | Servant | 293/117 |

FOREIGN PATENT DOCUMENTS

| | | | |
|---|---|---|---|
| 557733 | 1/1993 | European Pat. Off. | |
| 1344552 | 4/1902 | France | 293/118 |
| 655425 | 4/1929 | France | 293/118 |
| 2383047 | 10/1978 | France | |
| 2314551 | 10/1974 | Germany | |
| 2352179 | 4/1975 | Germany | 293/118 |
| 2609427 | 9/1976 | Germany | 293/118 |
| 2836006 | 3/1980 | Germany | |
| 4125264 | 2/1993 | Germany | |
| 4206022 | 9/1993 | Germany | |
| 198 02 841 A1 | 7/1998 | Germany | |
| 58-85764 | 5/1983 | Japan | |
| 2133262 | 5/1990 | Japan | |
| 406211092 | 8/1994 | Japan | 293/118 |
| 467528 | of 1906 | United Kingdom | 293/118 |
| 987996 | 3/1965 | United Kingdom | 293/118 |
| 2 069 940 | 9/1981 | United Kingdom | |

*Primary Examiner*—Joseph D. Pape
*Assistant Examiner*—Kiran Patel
*Attorney, Agent, or Firm*—David B. Kelley

[57] ABSTRACT

A stiffener assembly for a bumper system of a motor vehicle includes a stiffener operatively connected to the bumper system and movable between an up position and a down position based on a speed of the motor vehicle.

19 Claims, 2 Drawing Sheets

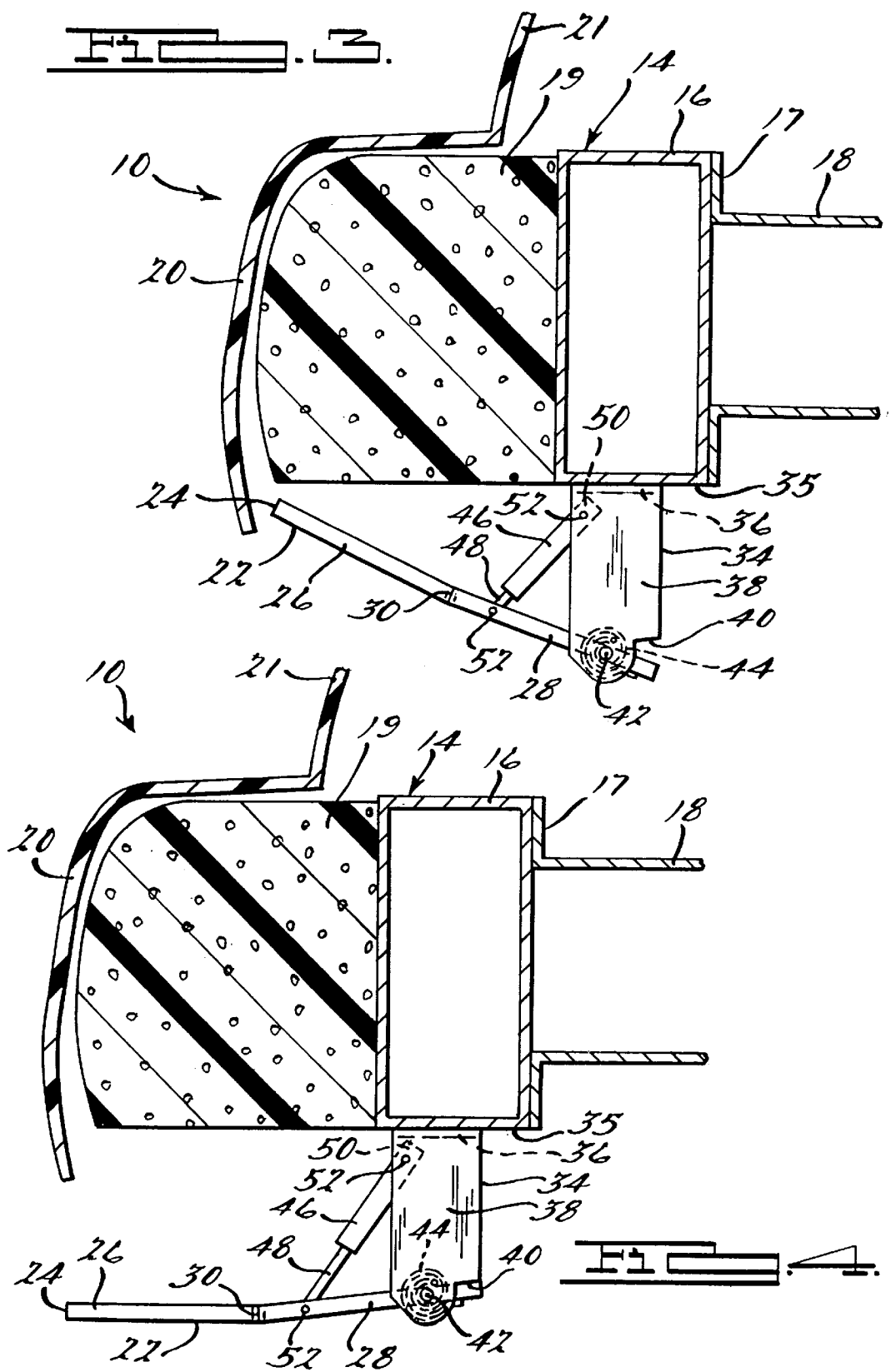

STIFFENER ASSEMBLY FOR BUMPER SYSTEM OF MOTOR VEHICLES

BACKGROUND OF THE INVENTION

1. Field of the Invention

The present invention relates generally to bumper systems for motor vehicles and, more specifically, to a stiffener assembly for a bumper system of a motor vehicle.

2. Description of the Related Art

It is known to provide a bumper system for a front end of a motor vehicle. Typically, the bumper system includes a bumper beam extending transversely and secured to a forward end of a pair of front rails which extend longitudinally and are spaced transversely. The bumper system also includes a bumper extending transversely and secured to the bumper beam. The bumper system may include a fascia disposed over and covering the bumper.

Although the above bumper system has worked well, it suffers from the disadvantage that when a pedestrian impacts the bumper system, a lower leg of the pedestrian may bend under the motor vehicle. Therefore, there is a need in the art to provide a stiffener assembly for a bumper system of a motor vehicle.

SUMMARY OF THE INVENTION

Accordingly, the present invention is a stiffener assembly for a bumper system of a motor vehicle. The stiffener assembly includes a stiffener operatively connected to the bumper system and movable between an up position and down position based on a speed of the motor vehicle.

One advantage of the present invention is that a stiffener assembly is provided for a bumper system of a motor vehicle. Another advantage of the present invention is that the stiffener assembly will move up or down based on the speed of the motor vehicle so that it will be in a predetermined position when required. Yet another advantage of the present invention is that the stiffener assembly resists a pedestrian's lower leg from bending under the motor vehicle in case of an impact. Still another advantage of the present invention is that the stiffener assembly reduces lateral knee bend angle when a pedestrian impacts the motor vehicle. A further advantage of the present invention is that the stiffener assembly will resist transferring damage to the motor vehicle and will deflect out of the way if contacted during normal driving conditions.

Other features and advantages of the present invention will be readily appreciated as the same becomes better understood after reading the subsequent description when considered in connection with the accompanying drawings.

BRIEF DESCRIPTION OF THE DRAWINGS

FIG. 3 is a fragmentary elevational view of the stiffener assembly and a portion of the motor vehicle of FIG. 1 illustrating the stiffener assembly in a first mode.

FIG. 4 is a fragmentary elevational view of the stiffener assembly and a portion of the motor vehicle of FIG. 1 illustrating the stiffener assembly in a second mode.

DESCRIPTION OF THE PREFERRED EMBODIMENT(S)

Figure 1:
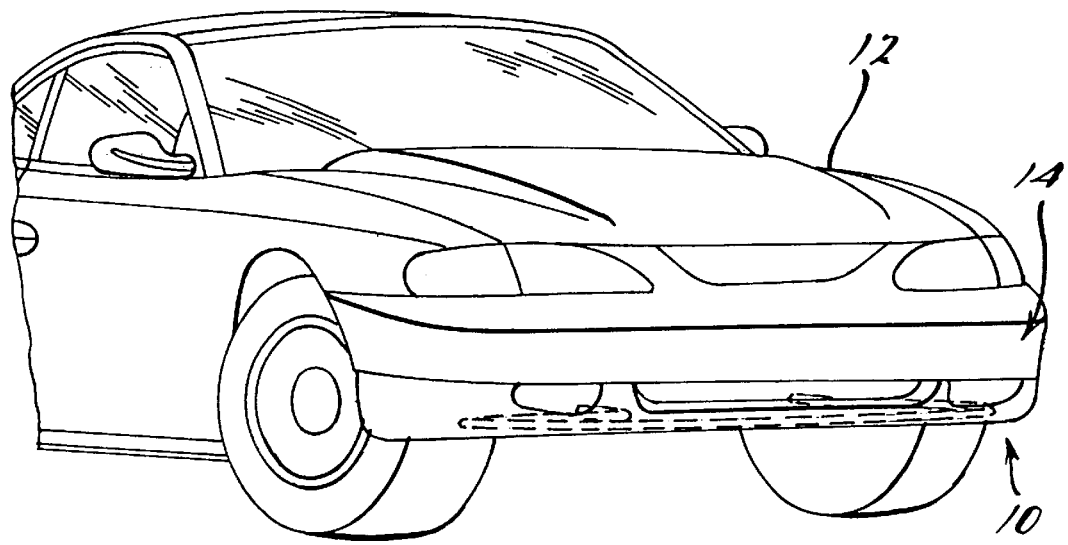
FIG. 1 is a perspective view of a stiffener assembly, according to the present invention, illustrated in operational relationship with a motor vehicle.

Referring to the drawings and in particular FIG. 1, one embodiment of a stiffener assembly 10, according to the present invention, is illustrated in operational relationship with a motor vehicle 12. The motor vehicle 12 includes a bumper system, generally indicated at 14, at a front or forward end of the motor vehicle 12. It should be appreciated that the stiffener assembly 10 is disposed below the bumper system 14 for a function to be described.

Figure 2:
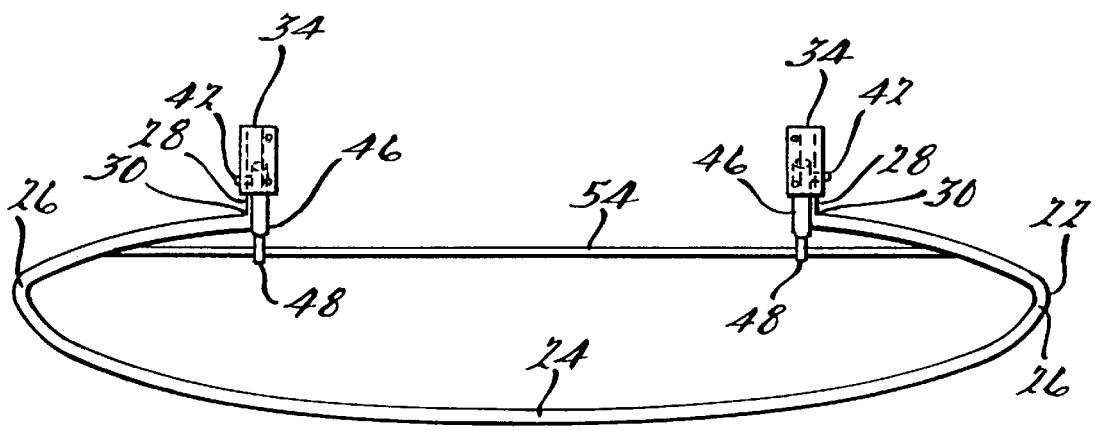
FIG. 2 is a plan view of the stiffener assembly of FIG. 1.

As illustrated in FIGS. 2 through 4, the bumper assembly 14 includes a bumper beam 16. The bumper beam 16 extends transversely and is secured to a forward end 17 of a pair of front rails 18 by suitable means such as welding. The bumper beam 16 is a hollow member having a generally rectangular shape. The bumper beam 16 is made of a relatively rigid material such as metal. The bumper system 14 includes a bumper 19. The bumper 19 extends transversely and is secured to the bumper beam 16 by suitable means such as fasteners (not shown). The bumper 19 is a solid member having a generally rectangular shape. The bumper 19 is made of a relatively deformable material such as foam. The bumper system 14 further includes a fascia 20 extending transversely and downwardly to cover the bumper 19. The fascia 20 is secured to vehicle structure (not shown) by suitable means such as fasteners (not shown). The fascia 20 is made of a relatively rigid material such as plastic. It should be appreciated that the fascia 20 may extend upwardly to form a grille 21. It should also be appreciated that the bumper system 14 is conventional and known in the art.

Referring to FIGS. 2 through 4, the stiffener assembly 10 includes a stiffener 22. The stiffener 22 has a front portion 24 extending transversely and an end portion 26 at each end having a general "C" shape. The stiffener 22 also has a flange portion 28 extending longitudinally from a free end of the end portion 26 to form stiffener "buckle points" indicated at 30. The stiffener 22 may be a bent tube or similarly shaped molded member. The stiffener 22 is made of a deformable, energy absorbing material such as plastic. Preferably, the stiffener 22 is integral, continuous, unitary and formed as one-piece. It should be appreciated that the stiffener 22 could be made from multiple parts that are bonded/welded/fastened together. It should be appreciated that the front portion 24 may be curved or arcuate to smoothly transition with the end portion 26. It should also be appreciated that the buckling strength of the stiffener 22 is selected to minimize any potential injury to a lower leg of a person or pedestrian.

The stiffener assembly 10 also includes at least one bracket 34 to connect the stiffener 22 to the bumper system 14. Preferably, a pair of brackets 34 are spaced transversely and attached to a lower or undersurface 35 of the bumper beam 16 at the front rails 18. The bracket 34 has a generally inverted L-shape with a first portion 36 secured to the bumper beam 16 by suitable means such as welding and a second portion 38 extending downwardly from the bumper beam 16. The bracket 34 includes a stiffener stop 40 extending transversely from the second portion 38 which prevent the stiffener 22 from rotating too far downward as will be described. It should be appreciated that the stiffener stop 40 is integral with the second portion 38. It should also be appreciated that the brackets 34 may include a rest stop (not shown) for the stiffener 22 in an upper position as will be described. It should further be appreciated that the bracket 34 is made of a rigid material such as metal and is formed as one-piece. It should also be appreciated that the bracket 34 could be made from multiple parts that are bonded/welded/bolted together.

The stiffener assembly 10 also includes a rotation pin 42 to pivotally connect the stiffener 22 to each bracket 34. The pin 42 is generally cylindrical in shape and extends through apertures in the flange portions 28 of the stiffener 22 and bracket 34. The stiffener assembly 10 may include a spring 44 for urging the stiffener 22 away from the bumper 19. The spring 44 is of a coil type disposed about the pin 42 with one end attached to the flange portion 28 and another end attached to the bracket 34 by suitable means. It should be appreciated that the spring 44 supplies a moment about the bracket 34, thereby forcing the stiffener 22 downward.

The stiffener assembly 10 further includes at least one actuator 46 for moving the stiffener 22 upward. Preferably, a pair of actuators 46 are spaced transversely and have one end 48 attached to the flange portion 28 of the stiffener 22 and another end 50 attached to the bumper beam 16 or bracket 34 by suitable means such as fasteners 52 and 62. The actuator 46 is of a linear type and is operatively connected to a source of electrical power such as a battery (not shown). The actuator 46 applies minimal resistance when not energized. The stiffener assembly 10 may include a rod 54 extending transversely to connect the ends 48 of the actuators 46 to the flange portions 28 of the stiffener 22. It should be appreciated that the actuator 46 is similar to that used in power door locks and is conventional and known in the art. It should also be appreciated that other suitable means may be employed for moving the stiffener 22.

In operation, the stiffener assembly 10 has a first mode as illustrated in FIG. 3. In the first mode at low speeds (i.e., less than or equal to approximately ten miles per hour), the actuators 46 will be energized and retracted, preventing the springs 44 from pushing the stiffener 22 downward. In this case, the stiffener 22 will remain in an upper position. If the motor vehicle 12 approaches a curb or a steep incline in this mode, the stiffener 22 will not be contacted. If the motor vehicle 12 is involved in an impact with another vehicle or a rigid obstacle in this mode, the stiffener 22 will buckle at the buckle points 30. As a result, the structure of the motor vehicle 12 will not be damaged. If the motor vehicle 12 is impacted by a pedestrian in this mode, the slower impact speed will not have a tendency to force the pedestrian's lower leg to bend under the motor vehicle 12.

Referring to FIG. 4, the stiffener assembly 10 has a second mode as illustrated. In the second mode at high speeds (i.e., greater than approximately ten miles per hour), the actuators 46 will be inactive. The springs 44 (along with gravity) will push the stiffener 22 downward until it contacts the stiffener stops 40 on the brackets 34. In this case, the stiffener 22 will be in a lower position. In the event the motor vehicle 12 approaches a curb or a steep incline in this mode, the stiffener 22 will be pushed upward by the obstacle against the springs 44 and may sustain minor cosmetic damage, similar to air dams on current conventional motor vehicles. If the motor vehicle 12 is involved in an impact with another vehicle or a rigid obstacle in this mode, the stiffener 22 will buckle at the buckle points 30 similar to the first mode. In the second mode, if the motor vehicle 12 impacts a pedestrian the stiffener 22 will resist the lower leg of the pedestrian from sliding under the motor vehicle 12. It should be appreciated that, in the second mode, the stiffener 22 may also serve as an air scoop, improving cooling and aerodynamics of the motor vehicle 12. It should also be appreciated that, in the second mode, the stiffener 22 is disposed below a horizontal plane as a result of a location of the stiffener stops 40. It should further be appreciated that a horizontal force can be resisted by the stiffener 22 and the stiffener stops 40 and a vertical upward force will simple rotate the stiffener 22 upward by compressing the springs 44.

Accordingly, the stiffener assembly 10 is speed sensitive and has a deployable/collapsible stiffener 22. The stiffener assembly 10 has a stiffener 22 which will also buckle before any damage is transferred to the vehicle's frame. The stiffener assembly 10 reduces lateral knee bend angle and will deflect upwardly if the motor vehicle 12 moves up a steep slope by rotating.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A stiffener assembly for a bumper system of a motor vehicle comprising:

a stiffener operatively connected to the bumper system and movable between an up position and a down position; and at least one actuator interconnecting said stiffener and the bumper system to raise said stiffener to said up position, said at least one actuator being energzed and retracted to keep said stiffener in said up position when a speed of the motor vehicle is below a predetermined speed.

2. A stiffener assembly as set forth in claim 1 wherein said stiffener has a front portion extending transversely and an end portion at each end of said front portion and a flange portion extending longitudinally at a free end of each said end portion.

3. A stiffener assembly as set forth in claim 2 wherein said front portion is arcuate in shape.

4. A stiffener assembly as set forth in claim 2 wherein said end portion has a C-shape.

5. A stiffener assembly as set forth in claim 2 wherein said flange portion and said end portion from a buckle point.

6. A stiffener assembly as set forth in claim 1 including a bracket attached to the bumper system at each end of said stiffener.

7. A stiffener assembly as set forth in claim 6 wherein said bracket has an L-shape with a first portion attached to the bumper system and a second portion extending downwardly from said second portion.

8. A stiffener assembly as set forth in claim 7 wherein said bracket has a stop extending transversely from said second portion to cooperate with said stiffener.

9. A stiffener assembly as set forth in claim 6 including a pin to rotatably connect said stiffener to said bracket.

10. A stiffener assembly as set forth in claim 6 including a spring attached to said stiffener and said bracket to urge said stiffener in said down position.

11. A stiffener assembly for a bumper system of a motor vehicle comprising:

at least one bracket attached to the bumper system;

a stiffener operatively connected to said at least one bracket and movable between an up position and a down position; and at least one actuator interconnecting said stiffener and said at least one bracket to raise said stiffener to said up position, said at least one actuator being energized and retracted to keep said stiffener in said up position when a speed of the motor vehicle is below a predetermined speed.

12. A stiffener assembly as set forth in claim 11 wherein said at least one bracket has an L-shape with a first portion attached to the bumper system and a second portion extending downwardly from said second portion.

13. A stiffener assembly as set forth in claim 11 wherein said at least one bracket has a stop extending transversely from said second portion to cooperate with said stiffener.

14. A stiffener assembly as set forth in claim 11 including a pin to rotatably connect said stiffener to said at least one bracket.

15. A stiffener assembly as set forth in claim 11 including a spring attached to said stiffener and said at least one bracket to urge said stiffener in said down position.

16. A stiffener assembly as set forth in claim 11 wherein said stiffener has a front portion extending transversely and an end portion at each end of said front portion and a flange portion extending longitudinally at a free end of each said end portion.

17. A stiffener assembly as set forth in claim 16 wherein said end portion has a C-shape.

18. A stiffener assembly as set forth in claim 16 wherein said flange portion and said end portion from a buckle point.

19. A stiffener assembly for a bumper system of a motor vehicle comprising:

a stiffener movable between an up position and a down position;

a bracket attached to the bumper system at each end of said stiffener;

said bracket having an L-shape with a first portion attached to the bumper system and a second portion extending outwardly from said first portion;

said bracket having a stop extending transversely from said second portion to cooperate with said stiffener;

a pin to rotatably connect said stiffener to said bracket;

a spring attached to said stiffener and said bracket to urge said stiffener in said down position: and at least one actuator interconnecting said stiffener and said bracket to raise said stiffener to said up position, said at least one actuator being energized and retracted to keep said stiffener in said up position when a speed of the motor vehicle is below a predetermined speed.

* * * * *